(12) United States Patent
Mizuno et al.

(10) Patent No.: US 8,521,410 B2
(45) Date of Patent: Aug. 27, 2013

(54) DRIVING ASSISTANCE APPARATUS (75) Inventors: Yusuke Mizuno, Anjo (JP); Kazunao Yamada, Toyota (JP); Yasushi Sakuma, Chita-gun (JP)

(73) Assignee: DENSO CORPORATION, Kariya (JP)

(*) Notice: Subject to any disclaimer, the term of this patent is extended or adjusted under 35 U.S.C. 154(b) by 142 days.

(21) Appl. No.: 13/171,776

(22) Filed: Jun. 29, 2011

(65) Prior Publication Data

US 2012/0004839 A1 Jan. 5, 2012

(30) Foreign Application Priority Data

Jul. 1, 2010 (JP) ................................. 2010-151236

(51) Int. Cl.
*G06F 19/00* (2011.01)
(52) U.S. Cl.
USPC .......................................... 701/123; 701/423
(58) Field of Classification Search
USPC .................. 701/123, 410, 423, 439
See application file for complete search history.

(56) References Cited

U.S. PATENT DOCUMENTS

| 7,548,805 | B2 | 6/2009 | Yamaguchi et al. | |
| 2007/0225882 | A1* | 9/2007 | Yamaguchi et al. | 701/36 |
| 2008/0294339 | A1* | 11/2008 | Tauchi et al. | 701/212 |
| 2011/0196601 | A1* | 8/2011 | Miura et al. | 701/200 |
| 2011/0241864 | A1* | 10/2011 | Fujiki et al. | 340/439 |

FOREIGN PATENT DOCUMENTS

| JP | A-2000-211383 | 8/2000 |
| JP | A-2008-186045 | 8/2008 |
| JP | A-2008-247318 | 10/2008 |
| JP | 2009193425 A | 8/2009 |
| JP | A-2009-244167 | 10/2009 |
| JP | A-2010-038958 | 2/2010 |
| JP | 201083276 A | 4/2010 |
| JP | A-2010-244308 | 10/2010 |

OTHER PUBLICATIONS

Office Action mailed Jul. 24, 2012 in corresponding JP Application No. 2010-151236 (and English translation).
Office Action mailed on Oct. 20, 2012 in corresponding JP Application No. 2010-151236. Please also note that U.S. Patent No. 7,548,805 was cited in an IDS filed on Aug. 17, 2017 and corresponds to JP-A-2007-253904 cited in the JP Office Action.

* cited by examiner

*Primary Examiner* — Helal A Algahaim
(74) *Attorney, Agent, or Firm* — Posz Law Group, PLC (57) ABSTRACT

A driving assistance apparatus mounted to a vehicle is provided. The driving assistance apparatus includes: an information acquisition component configured to acquire information on at least one of a route condition in a predetermined region of a future travel path of the vehicle, a present vehicle condition, and a past operation condition; a prediction component configured to predict, based on the information acquired by the information acquisition component, whether fuel efficiency of the vehicle is degraded in the future travel path; and a notification component configured to notify an operation for improvement of the fuel efficiency of the vehicle to an occupant of the vehicle in advance in cases where the fuel efficiency of the vehicle is predicted to be degraded in the future travel path.

8 Claims, 11 Drawing Sheets

RAILROAD-CROSSING-ANTICIPATION
SUPPRESSION OF NEEDLESS ACCELERATING

DRIVING ASSISTANCE APPARATUS

CROSS REFERENCE TO RELATED APPLICATION

The present application is based on and claims priority to Japanese Patent Application No. 2010-151236 filed on Jul. 1, 2010, disclosure of which is incorporated herein by reference.

BACKGROUND

1. Technical Field

The present disclosure relates to a driving assistance apparatus mounted to a vehicle that travels by using at least one of an internal combustion engine and a motor as a driving power source.

2. Description of Related Art

Patent Document 1: JP-2008-247318A1
Patent Document 2: JP-2010-38958A1

A known apparatus for a hybrid vehicle equipped with an engine and a motor creates a driving plan for switching a driving mode among a motor driving mode, an engine driving mode, a hybrid driving mode and the like to achieve low fuel consumption driving in a route from a departure point to a destination point, and switches the driving mode according to the driving plan (see Patent Document 1 for example).

Another known apparatus determines whether speed of a vehicle exceeds a predetermined value. When the speed of the vehicle is determined to exceed the predetermined value, the apparatus calculates an integration distance of running outside a vehicle speed range. The apparatus rates a driving operation of a driver based on the integration distance and notifies the driver of advice for fuel efficient driving. For this kind of apparatus, see Patent Document 2 for example.

The apparatus described in Patent Document 1 needs to create a detailed driving plan for a route from a departure point to a destination point, and further, requires a controller for switching the driving mode according to the driving plan, resulting in complicated configurations and complicated processes.

In the apparatus described in Patent Document 2, the fuel efficient driving advice is notified after the speed of the vehicle already exceeded the predetermined value. In this case, since the notification of the fuel efficient driving advice is ex-post advice, a fuel efficiency improvement effect is limited.

SUMMARY

In view of the foregoing, it is an objective of the present disclosure to provide a driving assistance apparatus that can improve a fuel efficiency improvement effect without creating a driving plan.

According to an aspect of the present disclosure, a driving assistance apparatus is mounted to a vehicle that travels by using a driving power source including at least one of an internal combustion engine and a motor. The driving assistance apparatus includes: an information acquisition component configured to acquire information on at least one of a route condition in a predetermined region of a future travel path of the vehicle, a present vehicle condition, and a past operation condition; a prediction component configured to predict, based on the information acquired by the information acquisition component, whether fuel efficiency of the vehicle is degraded in the future travel path; and a notification component configured to notify an operation for improvement of the fuel efficiency of the vehicle to an occupant of the vehicle in advance in cases where the fuel efficiency of the vehicle is predicted to be degraded in the future travel path.

According to the above driving assistance apparatus, it is possible to improve a fuel efficiency improvement effect without creating a driving plan.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION OF EMBODIMENTS

First Embodiment

Figure 1:
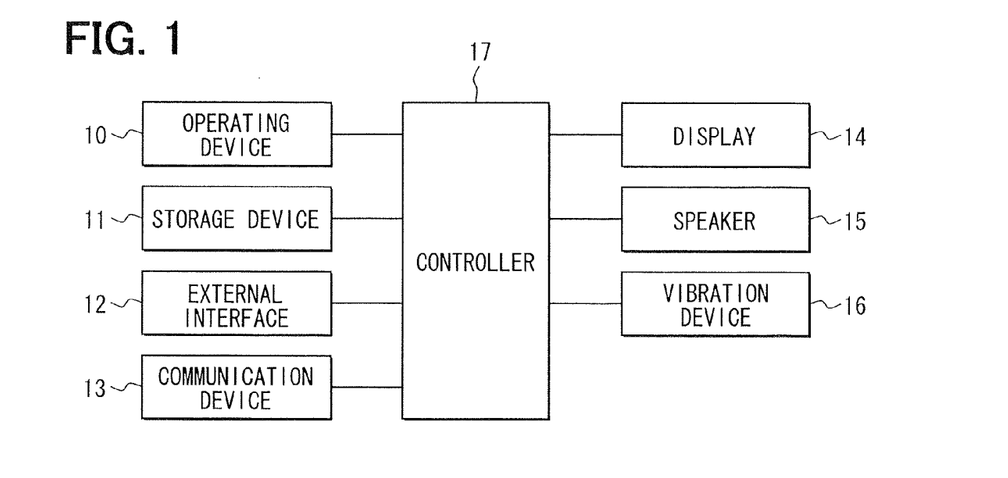
FIG. 1 is a diagram illustrating a driving assistance apparatus of a first embodiment.

FIG. 1 illustrates a configuration of a driving assistance apparatus of the present embodiment. The driving assistance apparatus includes an operating device 10, a storage device 11, an external interface 12, a communication device 13, a display device 14, a speaker 15, a vibration device 16 and a controller 17. The driving assistance apparatus is mounted to a hybrid vehicle, which travels using an internal combustion engine (also called "an engine") and a motor as a driving power source.

The operating device 10 includes a touch switch provided on a front surface of a display screen of the display device 14, a mechanical switch arranged in a periphery of the display screen of the display device 14, and the like. The operating device 10 outputs a signal, which depends on a user switch operation, to the controller 17.

The storage device 11 stores various data such as a map data, a past operation history (history of past operations) and the like. The storage device 11 includes a non-volatile memory, e.g., a hard disk drive, a flash memory etc. The map data includes a background data for map display, a feature data for various features (terrestrial objects), a road data for route retrieval, a map matching data for improvement of locating accuracy, and the like.

The external interface 12 is provided to conduct data transmission and data reception with an external device. The driving assistance apparatus is capable of acquiring various information such as present position information, route information and the like from a navigation apparatus via the external interface 12.

The communication device 13 is provided to wirelessly communicate with an outside of the driving assistance apparatus. The driving assistance apparatus is capable of receiving traffic jam information etc. via the communication device 13. The traffic jam information etc. may be transmitted from an information center (not shown).

The display device 14 includes a display screen, e.g., a liquid crystal display screen. The display device 14 displays an image or a video in accordance with a video signal or an image signal inputted from the controller 17. The speaker 15 outputs sound or speech in accordance with a sound or speech signal inputted from the controller 17. The vibration device 16 is mounted to a steering wheel etc. of the vehicle. The vibration device 16 is configured to vibrate in accordance with a signal inputted from the controller 17.

The controller 17 includes a computer, which include a CPU (central processing unit), a memory, an I/O (input/output) and the like. The CPU performs various operations in accordance with programs stored in the memory.

A vehicle speed signal indicative of speed of the vehicle is periodically inputted to the controller 17 from a vehicle speed sensor mounted to the vehicle. The controller 17 performs a process of calculating acceleration of the vehicle based on the vehicle speed signal.

In the present embodiment, the controller 17 performs a control process including: predicting whether fuel efficiency of the vehicle is degraded in a future travel path of the vehicle; and notifying an operation for improvement of the fuel efficiency of the vehicle in advance in cases where the fuel efficiency of the vehicle is predicted to be degraded in the future travel path of the vehicle.

Figure 2:
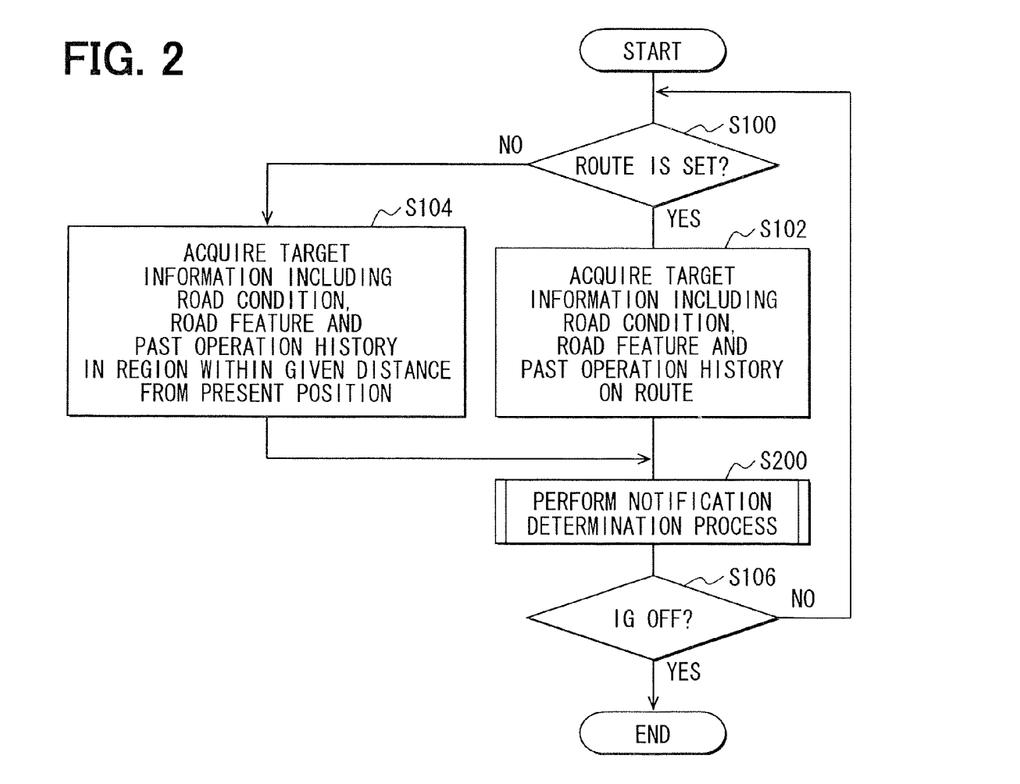
FIG. 2 is a flowchart illustrating a control process preformed by a controller of the driving assistance apparatus of the first embodiment.

FIG. 2 illustrates a flowchart of the control process. When an ignition switch of the vehicle is switched into an on state, the driving assistance apparatus is put in an operating state, and the controller 17 performs the control process illustrated in FIG. 2.

At S100, the controller 17 determines whether a route is set. Specifically, from the navigation apparatus, the controller 17 acquires information indicating whether a guidance route has been set, and determines whether the route is set.

Figure 3:
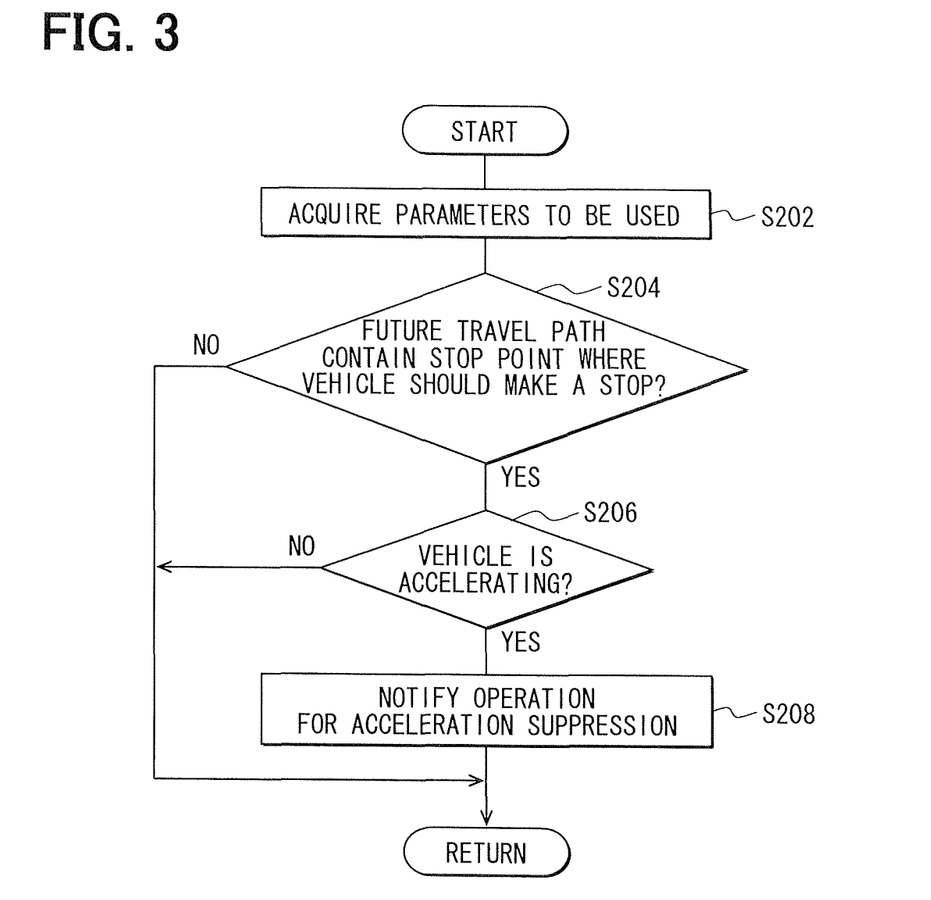
FIG. 3 is a diagram illustrating a notification determination process performed by the controller of the driving assistance apparatus of the first embodiment.

When it is determined that the route is set, corresponding to "YES" at S100, the process proceeds to S102. At S102, the controller acquires information on a road condition around the guidance route, a terrestrial object (road feature) around the guidance route and a past operation history around the guidance route, and the process proceeds to S200 named a notification determination process When it is determined that the route is not set, corresponding to "NO" at S100, the process proceeds to S104. At S104, the controller 17 acquires information on a road condition in a periphery region, a terrestrial object in the periphery region, and a past operation history in the periphery region, and the process proceeds to S200 named the notification determination process. In the above, the periphery region is a region located within a certain distance from the present position of the vehicle FIG. 3 illustrates a flowchart of the notification determination process. In the notification determination process, at S202, the controller 17 acquires parameters to be used.

The parameters acquired at S202 include a stop-required point, the present position of the vehicle, the acceleration of the vehicle, a road link where the vehicle is being located, and the like. The stop-required point, also called "stop point", indicates a point at which the vehicle is required to make a stop. For example, the stop point indicates a stop sign, a railroad crossing, or the like.

At S204, the controller 17 determines whether a stop point, at which the vehicle is required to make a stop, exists in the future travel path of the vehicle. Specifically, the controller 17 determines whether the stop point exists in the road link where the vehicle is being located.

At S206, the controller 17 determines whether the vehicle is accelerating, based on the acceleration of the vehicle.

In the present embodiment, when it is determined (i) that the road link where the vehicle is being located contains the stop point where the vehicle is required to make a stop and (ii) that the vehicle is accelerating, the controller 17 predicts that the fuel efficiency of the vehicle is degraded in the future travel path of the vehicle.

Figure 4:
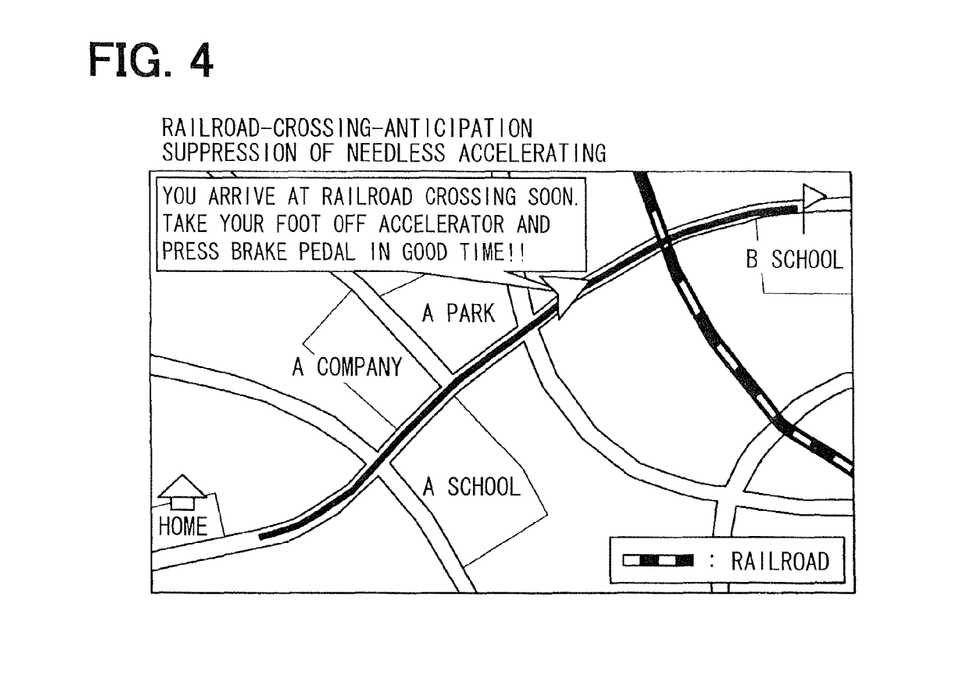
FIG. 4 is a diagram for explanation on a notification in accordance with the first embodiment.

As shown in FIG. 3, when it is determined that the road link where the vehicle is being located contains the stop point and that the vehicle is accelerating, the process proceeds to S208. At S208, the controller 17 issues an accelerating suppression notification, which prompts suppression of accelerating. For example, as shown in FIG. 4, when a railroad crossing exists as the stop point, the controller 17 causes the display device 14 to display a message indicating "You arrive at a railroad crossing soon. Take your foot off the accelerator and press a brake pedal in good time!!". In addition, the controller 17 causes the speaker 15 to output the above message as a speech output. After the S208, the process proceeds to S106 illustrated in FIG. 2.

When it is determined that the stop point does not exist in the road link where the vehicle is being located, the process proceeds to S106 without issue of the accelerating suppression notification. Similarly, when it is determined the vehicle is not accelerating although the stop point is determined to exist in the road link where the vehicle is being located, the process proceeds to S106 without issue of the accelerating suppression notification.

At S106, the controller 17 determines whether the ignition switch of the vehicle is put into an off state. When it is determined that the ignition switch of the vehicle is not in the off state, the process returns to S100. When it is determined that the ignition switch of the vehicle is in the off state, the process illustrated in FIG. 2 is ended.

Figure 5A:
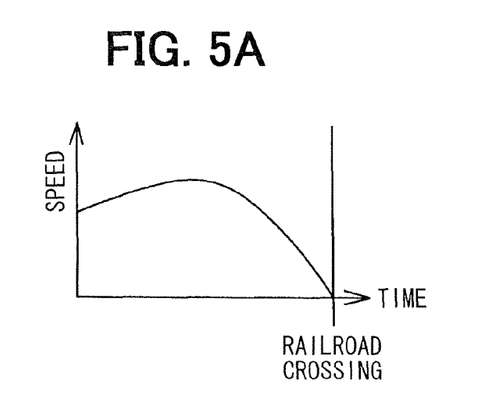
FIGS. 5A and 5B are graphs illustrating an effect of the notification in accordance with the first embodiment.
Figure 5B:
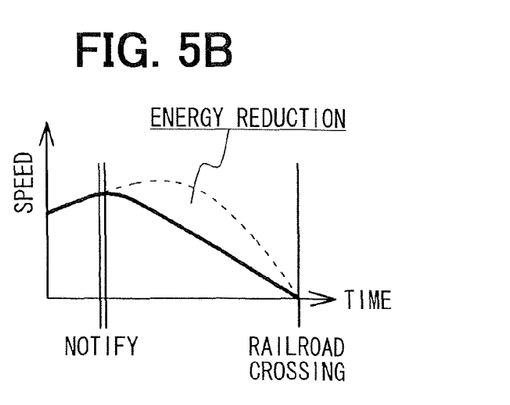

If the above accelerating suppression notification is not issued, energy may be needlessly consumed at the driving power source of the vehicle, as shown in FIG. 5A. However, if the above accelerating suppression notification is issued, velocity characteristic can become like that shown by the thick solid line in FIG. 5B and the needless energy consumption can be suppressed. As a result, it is possible to improve the fuel efficiency of the vehicle.

In the above configuration, the controller 17 acquires information on a road condition in a predetermined region of a future travel path of the vehicle, and a present vehicle condition. Based on the acquired information, the controller 17 predicts whether the fuel efficiency of the vehicle is degraded in the future travel path of the vehicle. When the fuel efficiency of the vehicle is predicted to be degraded in the future travel path of the vehicle, the controller 17 notifies an operation for improvement of the fuel efficiency of the vehicle to an occupant of the vehicle in advance. Therefore, it is possible to improve a fuel efficiency improvement effect without making a driving plan.

Moreover, when the controller 17 determines that (i) a stop point, at which the vehicle is required to make a stop, exists in the future travel path of the vehicle and (ii) the vehicle is accelerating, the controller 17 predicts that the fuel efficiency of the vehicle is degraded in the future travel path of the vehicle and issues a notification prompting the suppression of accelerating the vehicle. Therefore, it is possible to prevent the needless acceleration and prevent the fuel efficiency from being degraded.

Second Embodiment

Figure 6:
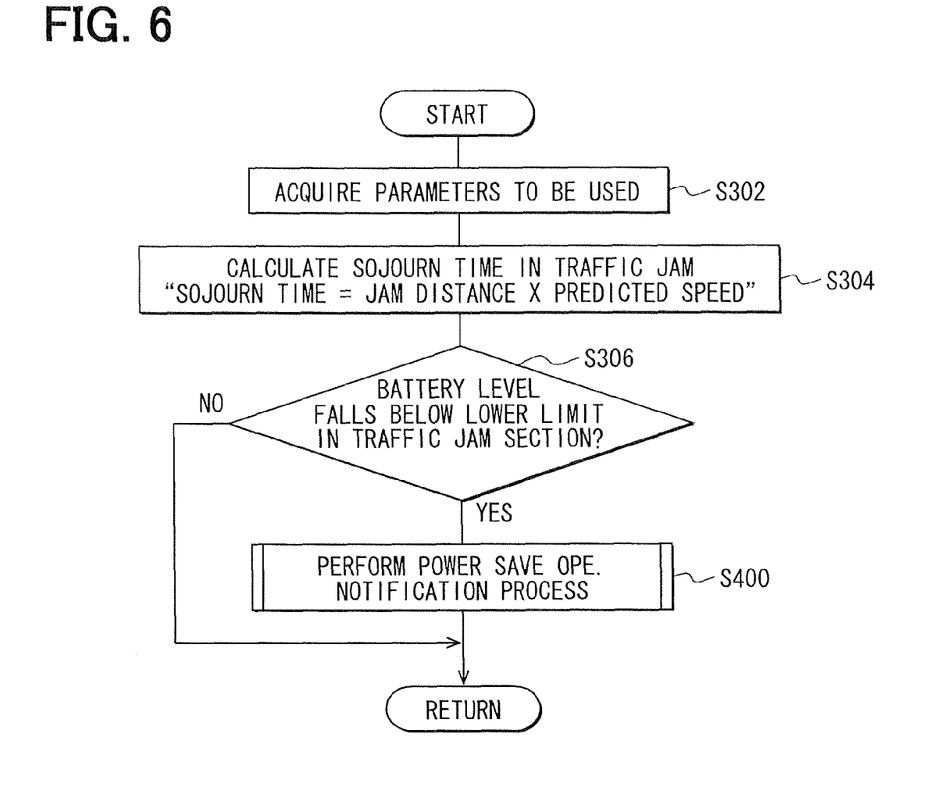
FIG. 6 is a flowchart illustrating a notification determination process performed by a controller of a driving assistance apparatus of a second embodiment.

A driving assistance apparatus of the present embodiment can have a configuration illustrated in FIG. 1. In the first embodiment, the notification determination process S200 illustrated in FIG. 3 is performed as the notification determination process illustrated in FIG. 1. In the present embodiment, a notification determination process S300 illustrated in FIG. 6 is performed in place of the notification determination process S200 illustrated in FIG. 3. It should be noted that like numerical references are used to refer to like parts or steps between embodiments described herein. Explanation on like parts or steps may be omitted.

The controller 17 performs the notification determination process S300 in the following way. At S302, the controller 17 acquires parameters to be used. In the above, the parameters include a present power consumption, a present remaining battery level of a battery, traffic jam information, a lower limit charge amount of the battery, an average speed in a traffic jam, and the like. The controller 17 can identify the present power consumption and the present remaining battery level based on signals inputted from a current sensor and a voltage sensor mounted to the battery. The controller 17 can acquire the traffic jam information from the information center via the communication device 13. The traffic jam information includes an average velocity in a traffic-jammed section. The lower limit charge amount of the battery is prescribed in battery specifications.

At S304, the controller 17 calculates a sojourn time in traffic jam. The sojourn time in the traffic jam can be calculated as "sojourn time in a traffic-jammed section=traffic jam distance×average speed in the traffic-jammed section".

At S306, the controller 17 determines whether the remaining battery level falls below the lower limit charge amount in the traffic-jammed section. Specifically, it is determine whether the following relation (1) is satisfied.

the lower limit charge amount of the battery>the present remaining battery level−(the sojourn time in the traffic jam×the present power consumption). Relation (1)

It should be noted that when the remaining battery level falls below the lower limit charge amount of the battery in the traffic-jammed section, this pressurizes the vehicle to start charging the battery in an inefficient manner in the traffic-jammed section, and this degrades the fuel efficiency of the vehicle in the future travel path of the vehicle. For this reason, the controller 17 predict whether the fuel efficiency of the vehicle is degraded in the future travel path of the vehicle, by determining whether the remaining battery level falls below the lower limit charge amount of the battery in the traffic-jammed section.

Figure 7:
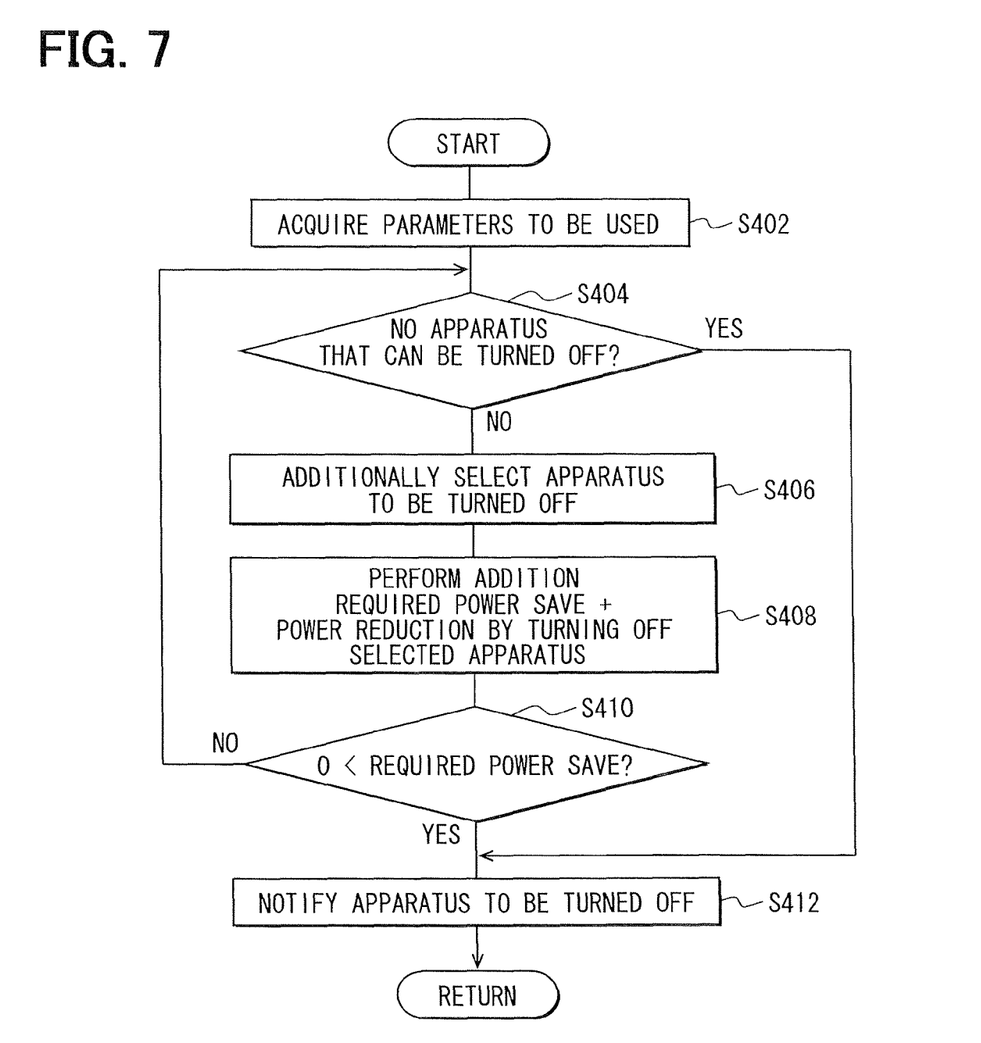
FIG. 7 is a flowchart illustrating a power save operation notification process performed by the controller of the driving assistance apparatus of the second embodiment.

When it is determined that the relation (1) is satisfied, the process proceeds to a power save operation notification process S400. FIG. 7 illustrates a flowchart of the power save operation notification process. At S402, the controller 17 acquires parameters to be used. The parameters include a power consumption and a required power saving of each of auxiliary apparatuses mounted to the vehicle. The auxiliary apparatuses include, for example, the air conditioner, the navigation apparatus and the like. The required power saving is defined as "the present remaining battery level−(the sojourn time in the traffic jam×the present power consumption)−the lower limit charge amount of the battery.

At S404, the controller 17 determines whether there is an apparatus that can be turned off. Specifically, the controller 17 causes the display device 14 to display a list of presently-operating auxiliary apparatuses, and prompts a user to select an apparatus that can be turned off. Thereby, the controller 17 determines whether there is an apparatus that can be turned off.

Figure 8:
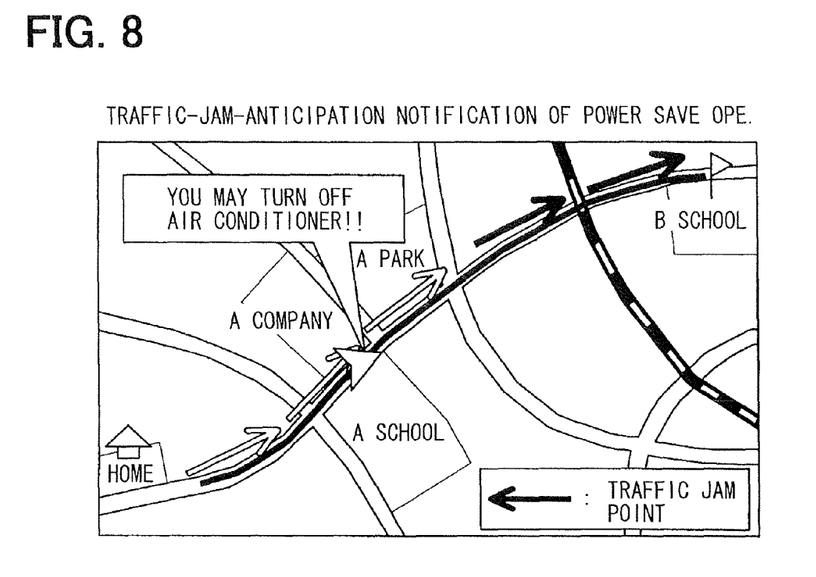
FIG. 8 is a diagram for explanation on a notification in accordance with the second embodiment.

When the controller 17 determines that there is an apparatus that can be turned off, corresponding to "YES" at S404, the process proceeds to S412. At S412, the controller 17 causes the display device 14 to display the apparatus to be turned off. For example, as shown in FIG. 8, the display device 14 displays a massage indicating "You may turn off air conditioner!!". Further, the controller 17 causes the speaker 15 to output the above message as speech output. After S412, this process is ended.

When the controller 17 determines that there is no apparatus that can be turned off, corresponding to "NO" at S404, the process proceeds to S406. At S406, the controller 17 additionally selects an apparatus to be turned off. Specifically, the controller 17 causes again the display device 14 to display a list of presently-operating auxiliary apparatus, and prompts a user to select an apparatus to be turned off.

At S408, the controller 17 newly calculates a required power saving by adding (i) a power reduction by turning off the apparatus additionally-selected at S406 to (ii) the required power saving calculated at S402.

At S410, the controller 17 determines whether the required power saving newly-calculated at S408 is greater than zero.

When it is determined that the required power saving newly-calculated at S408 is less than or equal to zero, corresponding to "NO" at S410, the process returns to S404, so that the new required power saving is calculated again at S408.

When it is determined that the required power saving newly-calculated at S408 is greater than zero, corresponding to "YES" at S410, the process proceeds to S412. At S412, the controller 17 notifies the occupant of the apparatus to be turned off. For example, the controller 17 causes the display device 14 to display a massage indicating "You may turn off air conditioner!!". Further, the controller 17 causes the speaker 15 to output the above message as speech output. After S412, this process is ended.

Figure 9A:
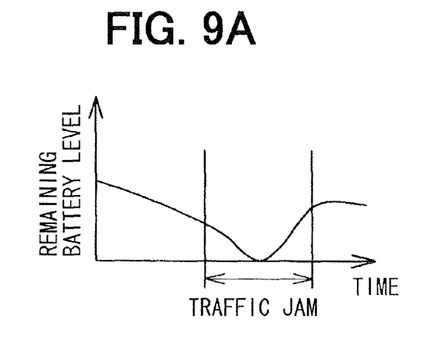
FIGS. 9A and 9B are graphs illustrating an effect of the notification in accordance with the second embodiment.
Figure 9B:
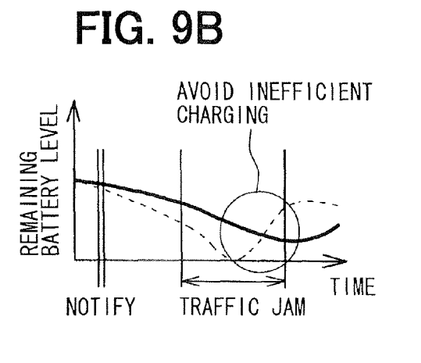

If the above notification is not issued, the remaining battery level may become zero in the traffic-jammed section and the battery may be forcibly charged in an in-efficient manner in the traffic-jammed section, as shown in FIG. 9A. However, when the above notification is issued, a remaining battery level characteristic can become like that shown by the thick solid line in FIG. 9B, and the forcible in-efficient changing of the battery in the traffic-jammed section can be avoided In the above configuration, when it is determined that (i) the future travel path contains an intermittent driving section where the vehicle repeatedly make a stop and a low-speed running, and (ii) the remaining battery level falls below a predetermined lower limit in the intermittent driving section, the controller 17 predicts that the fuel efficiency is degraded, and further, the controller 17 issues a notification prompting an operation for reduction of consumption of the electric power of the battery supplying the electric power to the motor. Therefore, it is possible to avoid the following situation. The vehicle has to start charging the battery in an inefficient manner in the intermittent driving section, and the fuel efficient of the vehicle is degraded in the future travel path of the vehicle.

Third Embodiment

Figure 10:
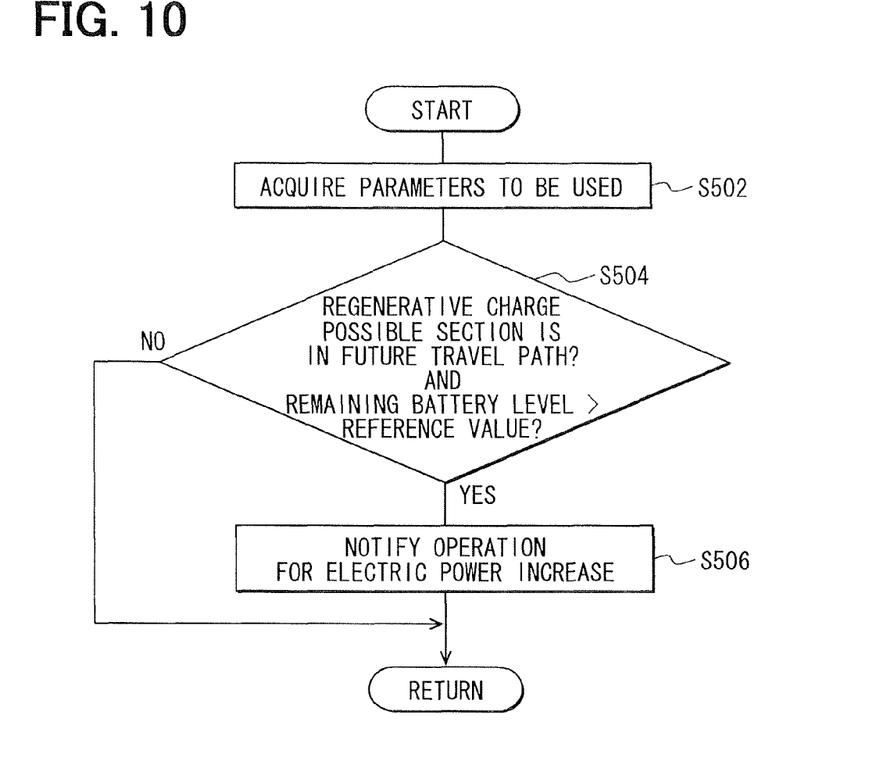
FIG. 10 is a flowchart illustrating a notification determination process performed by a controller of a driving assistance apparatus of a third embodiment.

In the first embodiment, the notification determination process S200 illustrated in FIG. 3 is performed as the notification determination process in FIG. 2. In the present embodiment, a notification determination process S500 illustrated in FIG. 10 is performed in place of that illustrated in FIG. 3.

The controller 17 performs the notification determination process S500 in the following way. At S502, the controller 17 acquires parameters to be used. The parameters include a present remaining battery level, an upper limit charge amount of the battery. The upper limit charge amount of the battery upper can be identified from battery specifications.

At S504, the controller 17 determines whether the future travel path of the vehicle contains a regenerative charge possible section (section where a regenerative charging of the battery is possible). At S504, the controller 17 further determines whether the remaining battery level is greater than or equal to a reference value. When the future travel path of the vehicle contains the regenerative charge possible section and when the remaining battery level is greater than or equal to the reference value, there is a possibility that the vehicle fails to acquire regenerative electric power in the regenerative charge possible section. Thus, when it is determined that the future travel path of the vehicle contains the regenerative charge possible section and that the remaining battery level is greater than or equal to the reference value, the controller 17 predicts that the fuel efficiency of the vehicle is degraded. The controller 17 can determine whether the future travel path of the vehicle contains the regenerative charge possible section, based on determining whether there is a down-hill in the future travel path on the basis of the map data. When the controller 17 determines on the basis of the map data that there is a down-hill in the future travel path, the controller 17 calculates a gravitational potential energy to be obtained by the down-hill. The gravitational potential energy E obtained by the down-hill can be calculated to be $E = m \times L \sin \theta \times g$, where m is mass of the vehicle, L is distance of the down-hill, $\theta$ is an angle of slope of the down-hill, and g is gravitational acceleration. In the present embodiment, by using "the upper limit charge amount of the battery–the gravitational potential energy" as the reference value, the controller 17 determines whether the present remaining battery level is greater than or equal to the reference value.

When the future travel path of the vehicle contains the regenerative charge possible section and the remaining battery level is greater than or equal to the reference value, the determination "YES" is made at S504, and the process proceeds to S506. At S506, the controller 17 issues a notification prompting an accelerator operation that causes the vehicle to travel using the motor as the driving power source. For example, in order for the vehicle to travel with the motor, the controller 17 causes the display device 14 display a message indicating "Try an accelerator operation for slow acceleration and slow deceleration!!". In addition, the controller 17 causes the speaker to output the above message as a speech output. After S506, the process is ended.

Figure 11A:
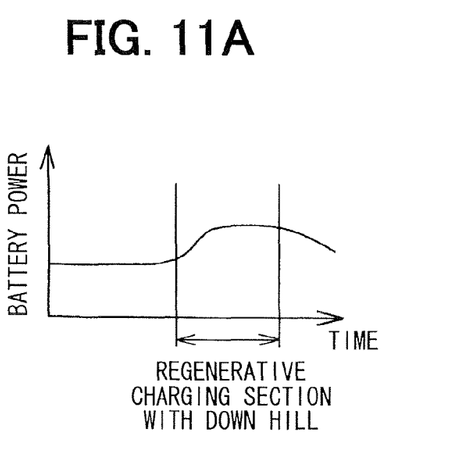
FIGS. 11A and 11B are graphs illustrating an effect of the notification in accordance with the third embodiment.
Figure 11B:
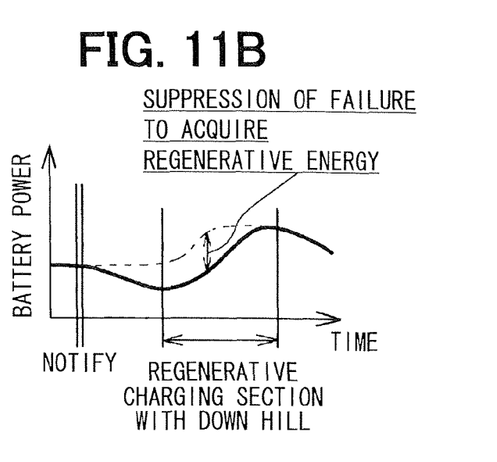

If the above notification is not issued, the vehicle may fail to acquire regenerative electric power in the regenerative charge possible section (down hill), as shown in FIG. 11A. However, when the above notification is issued, a remaining battery level characteristic can become like that shown by the thick solid line in FIG. 11B, and the vehicle can travel using the electric power of the battery before arriving at the regenerative charging possible section (down hill) and the vehicle can charge the battery by the regenerative electric power in the regenerative charging possible section (down hill). Therefore, it is possible to improve the fuel efficiency of the vehicle.

In the above configuration, when it is determined that (i) the future travel path of the vehicle contains the regenerative charge possible section and (ii) the battery level of the battery, which supplies the electric power to the motor, is greater than or equal to a predetermined reference value, the driving assistance apparatus predicts that fuel efficiency of the vehicle is degraded, and issues a notification prompting an accelerator operation that causes the vehicle to travel using the motor as the driving power source. Therefore, it is possible to avoid the following situation. The vehicle fails to acquire the regenerative electric power in the regenerative charge possible section of the future travel path, and the fuel efficiency of the vehicle is degraded in the future travel path of the vehicle.

Fourth Embodiment

Figure 12:
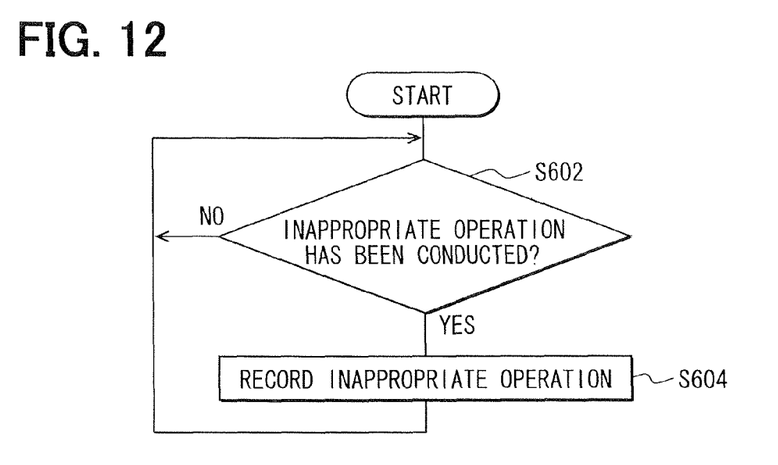
FIG. 12 is a flowchart illustrating an inappropriate operation determination process performed by a controller of a driving assistance apparatus of a fourth embodiment.
Figure 13:
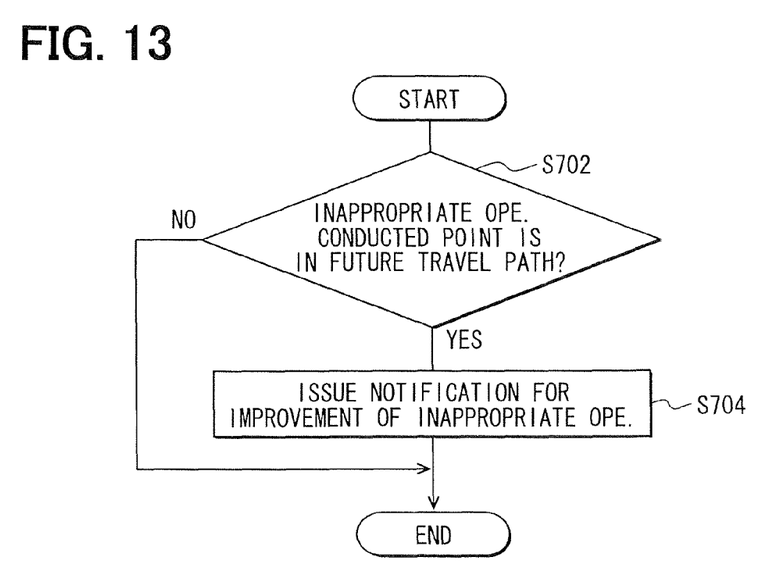
FIG. 13 is a flowchart illustrating a notification determination process performed by the controller of the driving assistance apparatus of the fourth embodiment.

The controller 17 of the present embodiment performs an inappropriate operation determination process illustrated in FIG. 12, and performs a notification determination process illustrated in FIG. 13 in place of the notification determination process illustrated in FIG. 3.

First, the inappropriate operation determination process illustrated in FIG. 12 will be described. At S602, the controller 17 determines whether an inappropriate operation is conducted in the run of the vehicle. In the above, the inappropriate operation is an operation that causes the fuel efficiency of the vehicle to be degraded. In the present embodiment, the inappropriate operation includes a braking operation that generates a braking force larger than a maximum regenerative braking force produced by regenerative electricity generation of the motor.

When the driver of the vehicle conducts the braking operation that generates braking forces larger than the maximum regenerative braking force produced by the regenerative electricity generation of the motor, the determination "YES" is made at S602, and the process proceeds to S604. At S604, the controller 17 records information on the conducted inappropriate operation in the storage device 11. The information to be recorded includes content of the inappropriate operation and location where the inappropriate operation is conducted. More specifically, the number of times the inappropriate operation has been conducted is accumulatively stored in association with a link ID corresponding to where the inappropriate operation has been conducted.

When the driver of the vehicle does not conduct the braking operation that generates braking forces larger than the maximum regenerative braking force produced by the regenerative electricity generation of the motor, the determination "NO" is made at S602, and the process returns to S602 without recording the information in the storage device 11.

As described above, a database is made as the inappropriate operation is conducted in the run of the vehicle. The database accumulatively stores the number of time the inappropriate operation has been conducted and the section (link) where the inappropriate operation has been conducted, together with the content of the inappropriate operation.

Next, the notification determination process illustrated in FIG. 13 will be described. In the present embodiment, the controller 17 performs the notification determination process illustrated in FIG. 13 in place of the notification determination process illustrated in FIG. 3.

At S702, based on the database accumulatively stored in the storage device 11, the controller 17 determines whether the future travel path of the vehicle contains an area where the inappropriate operation, which causes the fuel efficiency of the vehicle to be degraded, has been conducted.

Figure 14:
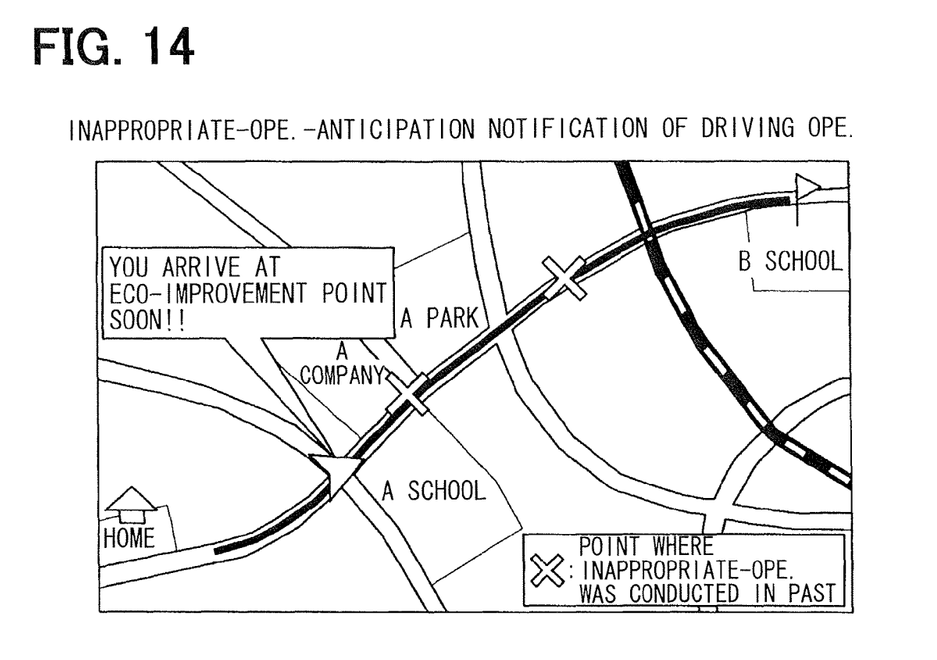
FIG. 14 is a diagram for explanation on a notification in accordance with the fourth embodiment.

When the controller 17 determines that the future travel path of the vehicle contains the area where the inappropriate operation has been conducted, the determination "YES" is made at S702, and the process proceeds to S704. At S704, the controller 17 issues a notification for improvement of the inappropriate operation. Specifically, the controller 17 causes the display device 14 to display a message indicating recommendation of a brake operation that generates the braking force smaller than the maximum regenerative braking force produced by the regenerative electricity generation of the motor. In addition, the controller 17 causes the speaker 15 to output the above message as a speech output. For example, as shown in FIG. 14, the display device 14 displays a massage indicating "you arrived at eco-improvement point soon!!" or "try a gentle braking operation!!", and the speaker 15 outputs the above message as a speech output. After S704, the notification determination process illustrated in FIG. 13 is ended.

In the above configuration, when it is determined that the inappropriate operation is conducted in the run of the vehicle, the information on the inappropriate operation is accumulatively recorded in a storage medium. The information on the inappropriate operation includes the content of the inappropriate operation and the location where the inappropriate operation is conducted. When it is determined, based on the information accumulatively stored in the storage medium, that the future travel path of the vehicle contains an area where the inappropriate operation has been conducted, the driving assistance apparatus predicts that the fuel efficiency of the vehicle is degraded in the future travel path of the vehicle, and issues a notification for drawing attention to the inappropriate operation. It is therefore possible to avoid the following situation; the fuel efficiency of the vehicle is degraded in the future travel path of the vehicle due to the inappropriate operation.

In the above example, the inappropriate operation includes the braking operation that generates a braking force larger than the maximum regenerative braking force produced by the regenerative electricity generation of the motor. However, the inappropriate operation is not limited to the above example. For example, the inappropriate operation may further include an accelerator operation that causes an energy consumption efficiency of the driving power source to be less than a predetermined threshold. When this accelerator operation is conducted, the driving assistance apparatus may issue, in the next run, a notification prompting an accelerator operation for fuel efficient acceleration (e.g., acceleration at a high efficiency point of the engine or a high efficiency point of the motor).

The inappropriate operation may further include a wavy driving operation, which is a combination of an accelerator operation and a brake pedal operation and causes the vehicle to repeat acceleration and deceleration a number of times larger than a prescribed value. When the above wavy driving operation is conducted, the driving assistance apparatus may issue a notification prompting suppression of the wavy driving operation in advance of the next run of the vehicle in the same section. To make a determination regarding the wavy driving operation, the driving assistance apparatus may integrate an amount of change in at least one of acceleration, vehicle speed and accelerator position per unit interval (per unit time or per unit distance), and may compare the calculated amount of change with a predetermined threshold.

The inappropriate operation may further include an accelerator operation that causes efficiency of the driving power source of the vehicle to be less than a threshold. When this accelerator operation is conducted, the driving assistance apparatus may notify the occupant of an accelerator operation for maintaining fuel-efficient steady-speed (e.g., high efficiency point of the engine or a high efficiency point of the motor) in advance of the next run of the same section.

Other Embodiments

Embodiments of the present invention are not limited to the above embodiments. Embodiments can have various forms, examples of which will be described below.

In the first embodiment, the information on a stop point (e.g., a stop sign, a railroad crossing or the like where the vehicle is required to make a stop) is acquired as an example of the information on the road condition in the future travel path of the vehicle. However, the information on the road condition is not limited to the above example. For example, information on traffic light state, traffic situation such as traffic jamming and the like, slope, and the like may be acquired as the information on the road condition. The information on a present vehicle condition may include information on accelerator position, brake pedal position (brake pedal pressing amount), a steering angle, gear shifter operation, vehicle speed, acceleration, driving power source class, braking power (braking force), auxiliary apparatus power consumption, regenerative energy, battery charge amount, consumed fuel, or the like. The information on a past operation condition may include information on accelerator position, brake pedal position (brake pedal pressing amount), steering angle, gear shifter operation, vehicle speed, acceleration, driving power source class, braking power (braking force), auxiliary apparatus power consumption, regenerative energy, battery charge amount, consumed fuel, or the like.

Figure 15:
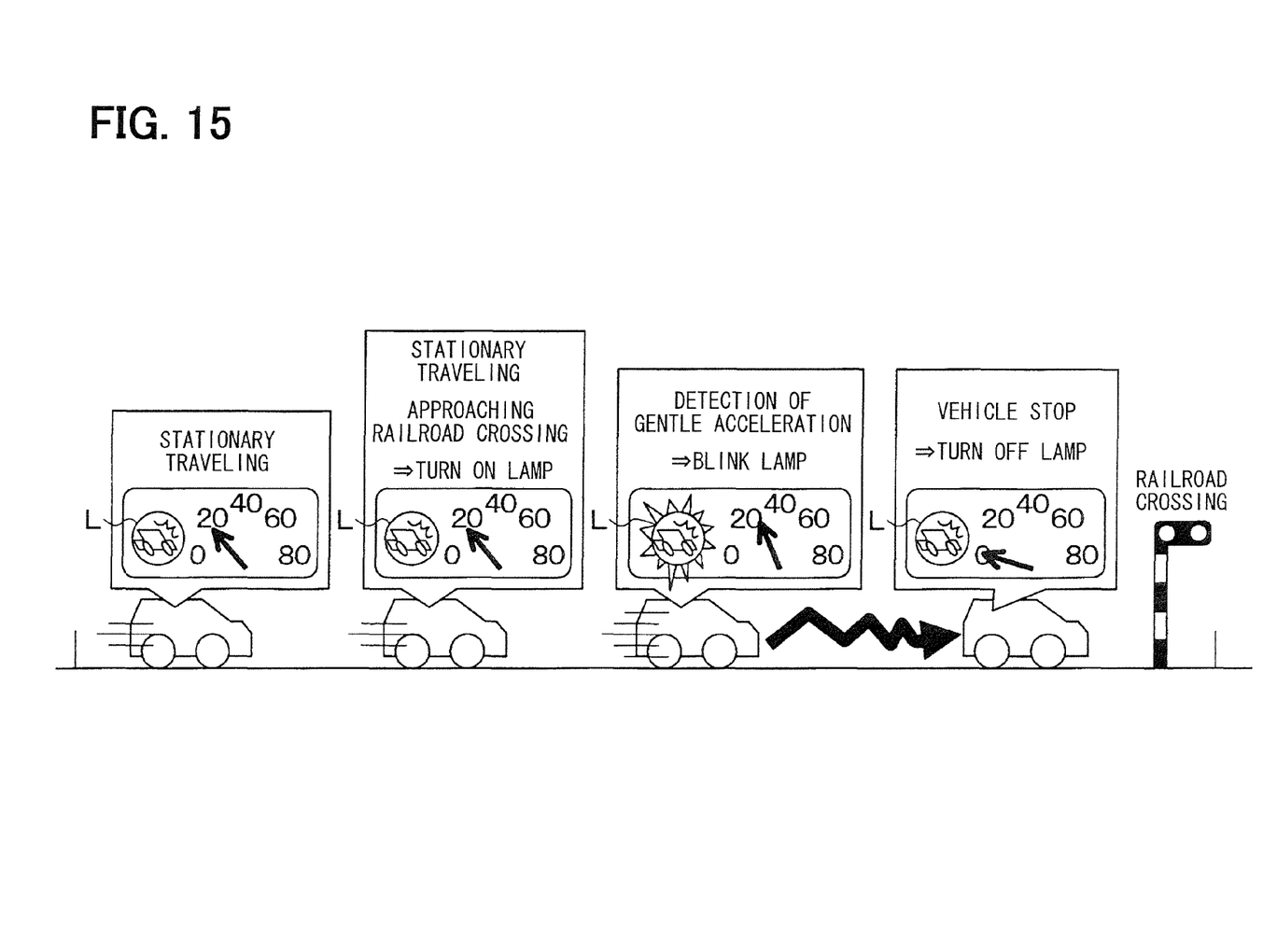
FIG. 15 is a diagram illustrating a first modification example.

In the first embodiment, a massage prompting suppression of accelerating is displayed on a map image, as shown in FIG. 4. Alternatively, as shown in FIG. 15, a lamp "L" may be arranged in a meter, and the notification prompting the suppression of accelerating may be issued by turning on the lamp "L, blinking the lamp "L" and the turning off the lamp "L". Alternatively, the notification may be issued by using a display object such as an icon and the like.

Figure 16:
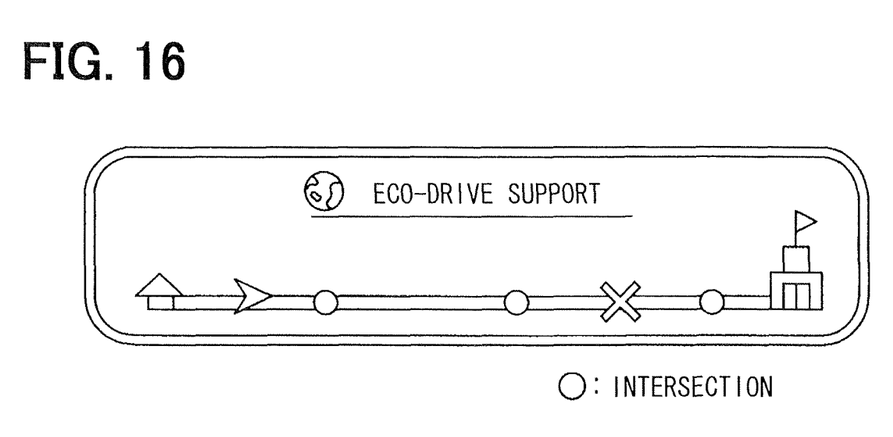
FIG. 16 is a diagram illustrating a second modification example.

In the first embodiment, a massage prompting suppression of accelerating is displayed on a map image, as shown in FIG. 4. Alternatively, such a simplified display as illustrated in FIG. 16 may be provided, and the notification may be issued using the simplified display.

In the first, second, third and fourth embodiments, various notifications are issued separately from each other. When a number of items to be notified is large, an item having a large influence on fuel efficiency improvement may be preferentially notified for example.

When a same event is continuously or consecutively detected, issue of a next notification may be prohibited until elapse of a certain period of time or until running a certain distance.

In the above embodiments, the controller 17, which performs S102, S104, S202, S302, S402, S502 and S602, can correspond to an information acquisition component or means. The controller 17, which performs S204, S206, S304, S306, S504 and S703, can correspond to a prediction component or means. The controller 17, which performs S208, S400, S506 and S704, can correspond to a notification component or means. The controller 17, which performs S602 to S604, can correspond to an inappropriate operation record component or means.

While the present disclosure has been described above with reference to various embodiments thereof, it is to be understood that the present disclosure is not limited to the above described embodiments and constructions. The present disclosure is intended to cover various modifications and equivalent arrangements.

What is claimed is:

1. A driving assistance apparatus mounted to a vehicle that travels by using a driving power source including at least one of an internal combustion engine and a motor, the driving assistance apparatus comprising:
    an information acquisition component configured to acquire information on both of a route condition in a predetermined region of a future travel path of the vehicle and a present vehicle condition;
    a prediction component configured to predict, based on the information acquired by the information acquisition component, whether fuel efficiency of the vehicle will be degraded in the future travel path; and
    a notification component configured to notify an operation for improvement of the fuel efficiency of the vehicle in the future travel path to an occupant of the vehicle in advance in cases where the fuel efficiency of the vehicle is predicted to be degraded in the future travel path,
    wherein:
    the prediction component determines, based on the information acquired by the information acquisition component, whether a stop point, at which the vehicle is required to make a stop, is present in the future travel path of the vehicle, and whether the vehicle is presently accelerating while traveling toward the stop point;
    the prediction component predicts that the fuel efficiency of the vehicle will be degraded in the future travel path, and the notification component gives the occupant of the vehicle a notification prompting suppression of present acceleration of the vehicle to reduce future needless energy consumption, when the prediction component determines that both
        (i) a stop point, at which the vehicle is required to make a stop, is present in the future travel path of the vehicle and
        (ii) the vehicle is presently accelerating while traveling toward the stop point.

2. The driving assistance apparatus according to claim 1, wherein:
    the driving assistance apparatus is mounted to the vehicle that travels by using the motor as the driving power source; and
    when the prediction component determines, based on the information acquired by the information acquisition component, that
        (i) the future travel path of the vehicle contains an intermittent driving section where the vehicle repeatedly makes a stop and a low-speed running, and
        (ii) a remaining battery level of a battery, the battery supplying electric power to the motor, becomes smaller than a predetermined lower limit in the intermittent driving section,
    the prediction component predicts that the fuel efficiency of the vehicle is degraded in the future travel path and the notification component issues a notification prompting an operation for reduction of consumption of the electric power of the battery.

3. The driving assistance apparatus according to claim 1, wherein:
    the driving assistance apparatus is mounted to the vehicle that travels by using the internal combustion engine and the motor as the driving power source; and
    when the prediction component determines, based on the information acquired by the information acquisition component, that
        (i) the future travel path of the vehicle contains a regenerative charge possible section where a regenerative charging of a battery, the battery supplying electric power to the motor, is possible and
        (ii) a remaining battery level of the battery is greater than or equal to a predetermined reference value,
    the prediction component predicts that the fuel efficiency of the vehicle is degraded in the future travel path and the notification component issues a notification prompting an accelerator operation that causes the vehicle to travel by using the motor as the driving power source.

4. The driving assistance apparatus according to claim 1, further comprising:
    an inappropriate operation record component configured to record information on an inappropriate operation in a storage medium in cases where the inappropriate operation record component determines that the inappropriate operation, which is an operation causing the fuel efficiency of the vehicle to be degraded, is conducted in run of the vehicle,
    wherein:
    the information on the inappropriate operation includes content of the inappropriate operation and location where the inappropriate operation is conducted; and
    when the prediction component determines, based on the stored information on the inappropriate operation, that the future travel path contains an area where the inappropriate operation was conducted,
    the prediction component predicts that the fuel efficiency of the vehicle is degraded in the future travel path and the notification component issues a notification for drawing attention to the inappropriate operation.

5. The driving assistance apparatus according to claim 4, wherein:
    the inappropriate operation includes a braking operation that generates a braking force larger than a maximum regenerative braking force produced by regenerative electricity generation of the motor.

6. The driving assistance apparatus according to claim 4, wherein:
    the inappropriate operation includes an accelerator operation that causes energy consumption efficiency of the driving power source to be less than a predetermined threshold.

7. The driving assistance apparatus according to claim 4, wherein:
    the inappropriate operation includes a wavy driving operation that causes the vehicle to repeat acceleration and deceleration a number of time larger than a prescribed value.

8. The driving assistance apparatus according to claim 4, wherein:
the inappropriate operation includes an accelerator operation that causes efficiency of the driving power source of the vehicle to be less than a predetermined threshold.

* * * * *